(12) United States Patent
Jacobson et al.

(10) Patent No.: US 9,191,302 B1
(45) Date of Patent: Nov. 17, 2015

(54) SYSTEM AND METHOD FOR IDENTIFYING NETWORK TOPOLOGY INFORMATION IN MULTIPLE AREAS

(76) Inventors: Van Jacobson, Woodside, CA (US); Cengiz Alaettinoglu, Sherman Oaks, CA (US); Chia-Chee Kuan, Los Altos, CA (US)

( * ) Notice: Subject to any disclaimer, the term of this patent is extended or adjusted under 35 U.S.C. 154(b) by 1045 days.

(21) Appl. No.: 11/825,420

(22) Filed: Jul. 6, 2007

Related U.S. Application Data

(63) Continuation of application No. 11/583,326, filed on Oct. 18, 2006, which is a continuation of application No. 09/973,234, filed on Oct. 9, 2001.

(60) Provisional application No. 60/240,764, filed on Oct. 16, 2000, provisional application No. 60/277,459, filed on Mar. 20, 2001, provisional application No. 60/277,392, filed on Mar. 20, 2001.

(51) Int. Cl.
*G06F 15/173* (2006.01)
*H04L 12/751* (2013.01)
*H04L 12/715* (2013.01)
*H04L 12/721* (2013.01)

(52) U.S. Cl.
CPC ............... *H04L 45/02* (2013.01); *H04L 45/04* (2013.01); *H04L 45/12* (2013.01)

(58) Field of Classification Search
USPC .................................................. 709/223–229
See application file for complete search history.

(56) References Cited

U.S. PATENT DOCUMENTS

| | | | | |
|---|---|---|---|---|
| 5,557,745 A | * | 9/1996 | Perlman et al. ............... | 709/242 |
| 6,473,421 B1 | * | 10/2002 | Tappan ......................... | 370/351 |
| 6,584,093 B1 | * | 6/2003 | Salama et al. ................ | 370/351 |
| 6,606,303 B1 | * | 8/2003 | Hassel et al. ................. | 370/238 |
| 6,606,325 B1 | * | 8/2003 | Cain ............................. | 370/410 |
| 6,823,395 B1 | * | 11/2004 | Adolfsson .................... | 709/242 |
| 6,928,483 B1 | * | 8/2005 | Cain ............................. | 370/351 |
| 6,985,959 B1 | * | 1/2006 | Lee ............................... | 709/238 |
| 7,027,448 B2 | * | 4/2006 | Feldmann et al. ............ | 370/401 |
| 2004/0202111 A1 | * | 10/2004 | Beshai et al. ................. | 370/237 |
| 2008/0084890 A1 | * | 4/2008 | Kompella ..................... | 370/400 |

\* cited by examiner

*Primary Examiner* — Joshua Joo
(74) *Attorney, Agent, or Firm* — Hulsey Hunt & Parks

(57) ABSTRACT

A system and method identifies topology information of an autonomous system as well as other autonomous systems, and can provide topology information in response to requests.

15 Claims, 8 Drawing Sheets

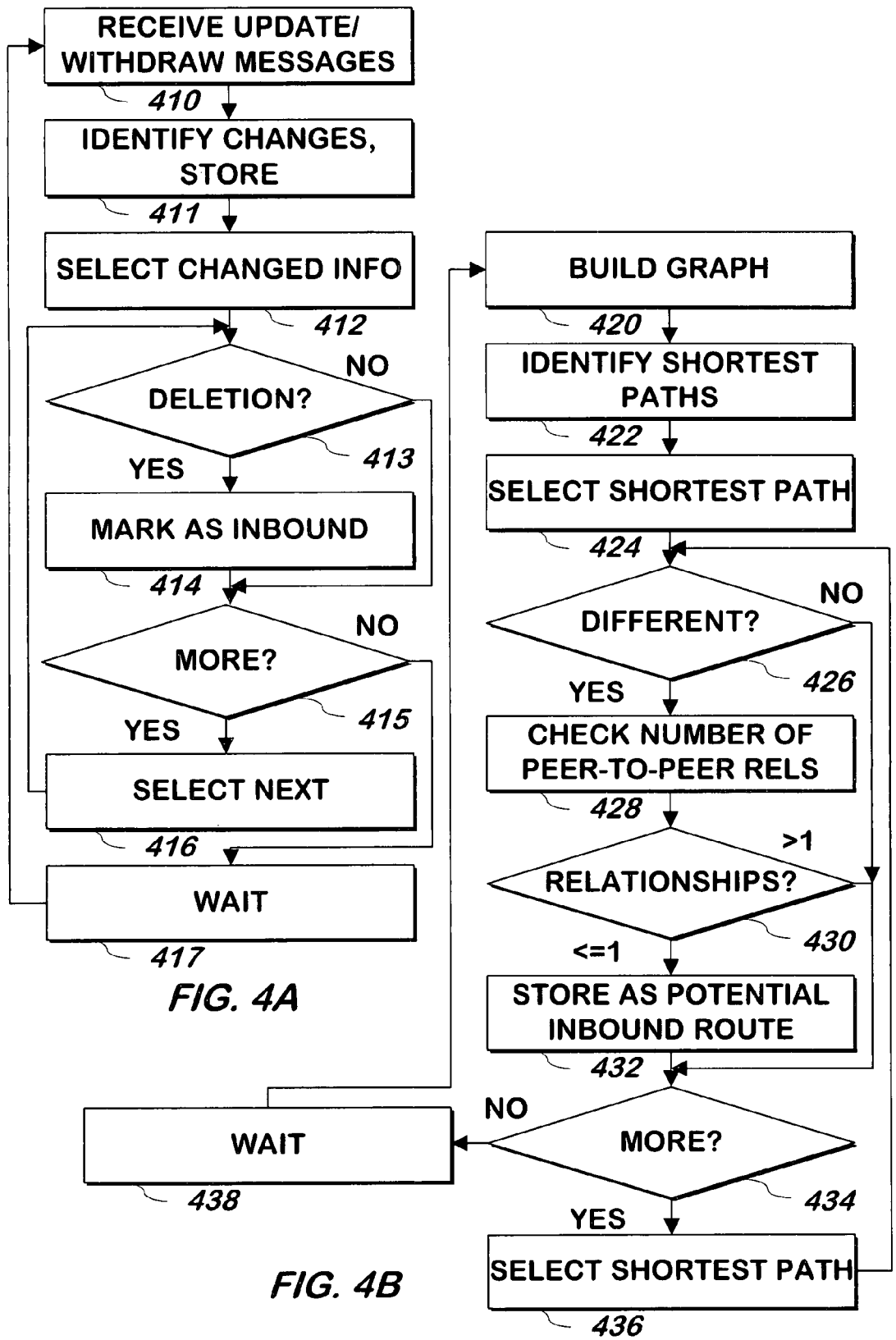

SYSTEM AND METHOD FOR IDENTIFYING NETWORK TOPOLOGY INFORMATION IN MULTIPLE AREAS

RELATED APPLICATIONS

This application is a continuation of application Ser. No. 11/583,326, entitled, "System and Method for Identifying Network Topology Information", filed on Oct. 18, 2006 by Van Jacobson, Cenzig Alaettinoglu, and Chia-Chee Kuan, which is a continuation of application Ser. No. 09/973,234, entitled, "System and Method for Defending Against Attacks on Computer Systems" filed by Van Jacobson and Kevin Martin on Oct. 9, 2001, which claims the benefit U.S. Provisional Application No. 60/240,764 entitled, "Method and Apparatus for Defending Against Attacks on Computer Systems" filed Oct. 16, 2000 by Van Jacobson and Kevin Martin, U.S. Provisional Application No. 60/277,459 entitled, "Method and Apparatus for Identifying Network Topology Information" filed Mar. 20, 2001 by Van Jacobson, Cengiz Alaettinoglu, and Chia-Chee Kuan, and U.S. Provisional Application No. 60/277,392 entitled, "Method and Apparatus for Filtering Packets to Reduce the Effectiveness of a Network Attack" filed Mar. 20, 2001 by Van Jacobson Kevin Martin, Jagane Sundar and David Cornelius and each is hereby incorporated herein by reference in its entirety.

FIELD OF THE INVENTION

The present invention is related to computer communications and more specifically to the identification of computer communication topological information.

BACKGROUND OF THE INVENTION

Conventional computer networks may be made up of multiple pieces of interconnected equipment including conventional routers or other devices. A network of devices that is under the administrative control of an entity such as an ISP and does not require connection to a network under control of another entity may be referred to as an autonomous system, or AS. At the border of a network of an autonomous system are devices with connections to internal networks, other autonomous systems (connected via the Public Internet, for example) or both of these. An "internal network" is one or more computer systems identified by one or more network addresses that are operated by the operator of the autonomous system or a customer of the operator of the autonomous system: it need not contain a network at all, because an internal network can be a single computer system.

It may sometimes be desirable to identify topological information such as layer three topological information about the autonomous system. Topological information may include identifying some or all of the devices that communicate in one or more directions with one or more devices at one or more addresses. For example, it may be desirable to identify all of the routers that will be used to communicate between two internal networks in an AS or to identify one or more paths that may be used to communicate between an internal network of the AS and an internal network of a different AS. If this information is not known with certainty, it may be desirable to predict devices that have a good potential for such communication. Topological information may include information that is more specific, such as which of the communication equipment in a network of an autonomous system handles or has a good potential for handling traffic at the border of the autonomous system for communication with a specific internal network of that AS or another AS. Such information may be useful for engineering and analysis of the autonomous system and for blocking certain traffic from entering the autonomous system or graphically displaying the path of traffic to or from such an internal network or another autonomous system. Some networking equipment can supply portions of this information, but none of the equipment can supply a complete set of such topological information for every case.

One reason that it is not possible to supply a complete set of topological information in every case is due to asymmetries of inter-AS network communications. Although it is possible to identify the communication equipment that may be used to communicate from a primary AS in an outbound direction to another computer system or network connected to the network via another AS, the path taken in the opposite direction may not be the same. Thus, it may not be possible to identify with 100 percent accuracy the device or devices at the border of the primary AS from which communications from that computer system or network on the other AS will be received.

Certain systems may not require 100 percent accuracy of such information. For such systems, while a high degree of accuracy is desirable, perfect accuracy may not be required.

What is needed is a system and method that can identify topological information about a network, that can identify one or more border routers or other communication equipment that handles, or is identified as having the potential to handle, traffic between the border of the autonomous system and computer system or network, and that can perform these functions with a high degree of accuracy, even for cases in which precise topological information may not be known with certainty.

SUMMARY OF INVENTION

A method and system receives information about communications within an AS and between autonomous systems and identifies the topology of the AS and internal networks of the autonomous system and information about how the AS will communicate with other autonomous systems and internal networks of other autonomous systems. The method and system identifies one or more paths between the AS and one or more locations outside the AS that, while possible, were not received as paths to the locations outside the AS but nevertheless may be good candidates for receiving communications from such locations. The system and method can identify topology information about intra-AS paths or inter-AS paths, or information about specific devices such as individual routers such as border routers of the AS that are in a path, between two points.

BRIEF DESCRIPTION OF THE DRAWINGS

FIG. 3A is a flowchart illustrating a method of collecting intra-AS topology information according to one embodiment of the present invention.

FIG. 4A is a flowchart illustrating a method of receiving inter-AS topology information according to one embodiment of the present invention.

FIG. 4B is a flowchart illustrating a method of a processing inter-AS topology information according to one embodiment of the present invention.

DETAILED DESCRIPTION OF A PREFERRED EMBODIMENT

Figure 1:
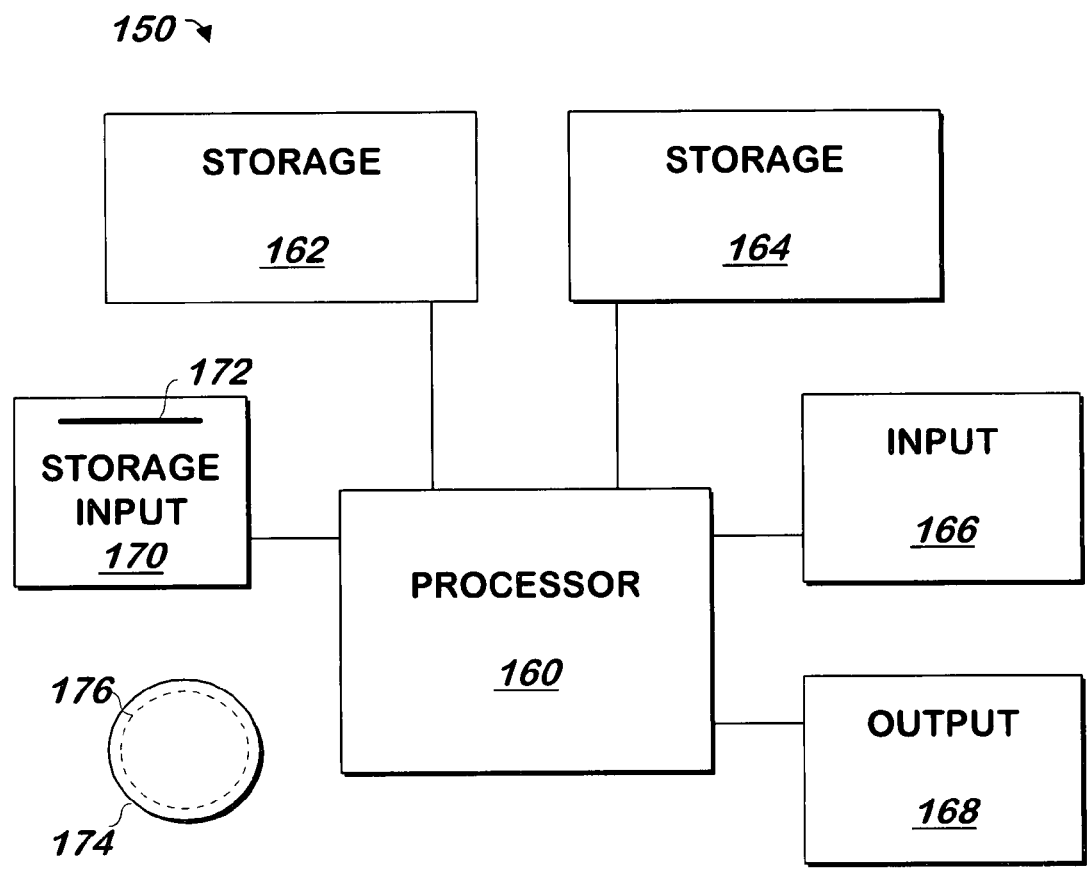
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running the Windows (95, 98 or NT) operating system commercially available from Microsoft Corporation of Redmond Wash. or a Macintosh computer system running the MacOS commercially available from Apple Computer Corporation of Cupertino, Calif. and the Netscape browser commercially available from Netscape Computer Corporation of Mountain View, Calif. although other systems may be used. Other embodiments may include Pentium compatible PC servers, rack mounted or otherwise, running the conventional Free BSD operating system.

B. Communication Interface and System Overview

Figure 2A:
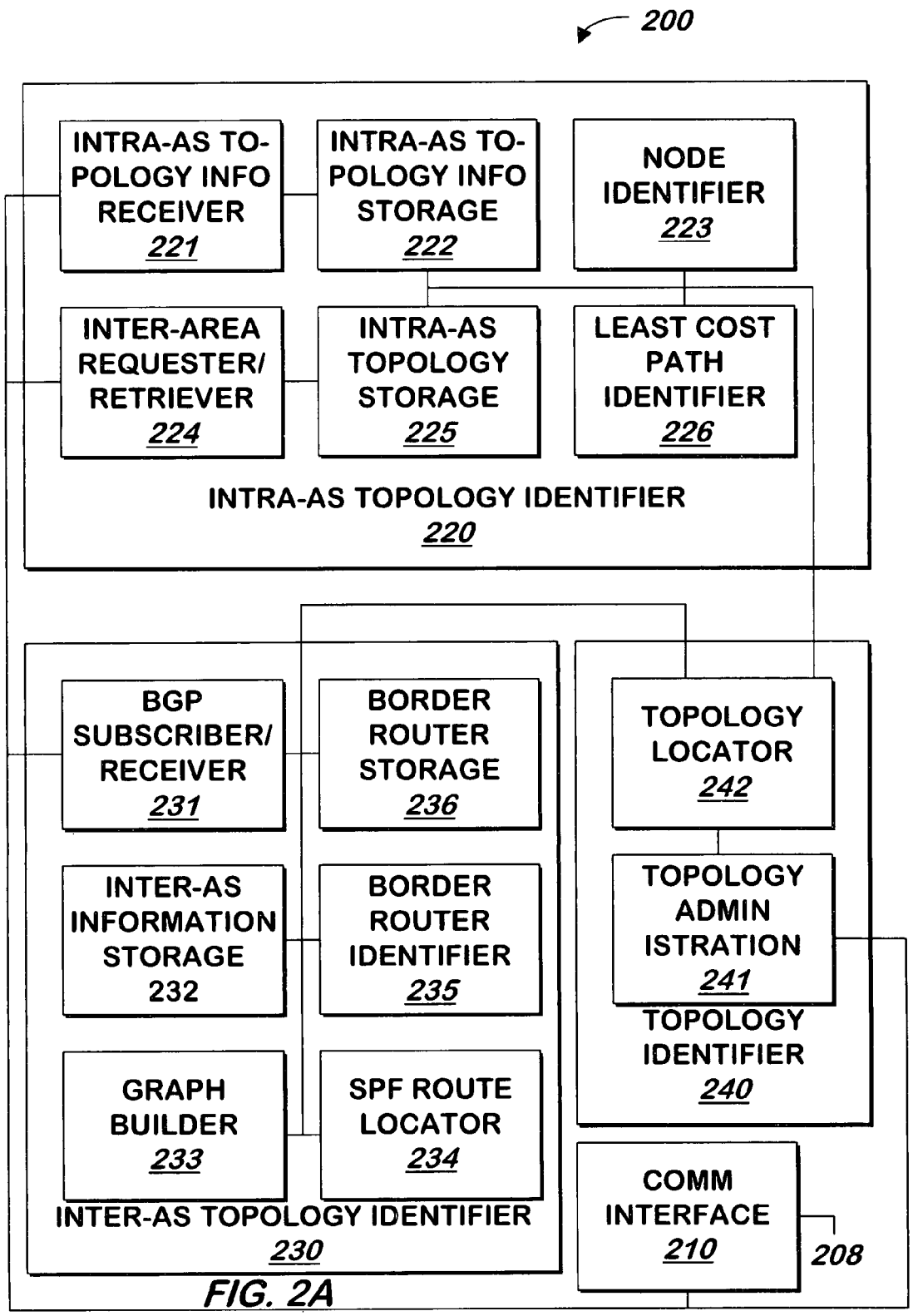
FIG. 2A is a block schematic diagram of a system for identifying topology information according to one embodiment of the present invention.

Referring now to FIG. 2A, a system 200 for identifying topology information is shown according to one embodiment of the present invention. Communication interface 210 is a conventional communication interface capable of communicating with devices that can send IGP (e.g. IS-IS or OSPF) messages, and is also capable of communication with devices that can send (I)BGP messages, via input/output 208, which may be coupled to a network of an autonomous system, the Internet or both. All communication to and from system 200 may be performed as described herein via communication interface 210 and input/output 208.

In one embodiment, the system 200 includes one or both of the two topology identifiers 220, 230 and topology identifier 240, each described in more detail below. Intra-AS topology identifier 220 receives, records and processes topology information, such as IS-IS or OSPF messages that relate to an AS, referred to herein as a primary AS, being sent from network device to network device. Inter-AS topology identifier 230 receives, records and processes topology information such as (I)BGP messages, from network devices of the primary autonomous system, or from route reflectors, that describe communication paths from certain routers known as border routers to destinations outside the primary AS. Topology identifier 240 uses the information received, recorded and processed by intra-AS topology identifier 220 and inter-AS topology identifier 230 to provide topology information about the primary AS or paths that include the primary AS and other autonomous systems.

C. Receipt and Storage of Intra-AS Packets.

Intra-AS topology identifier 220 will now be described. Intra-AS topology information receiver 221 is coupled to communication interface 210 and detects and receives IS-IS link state packet messages (LSPs) from communication interface 210, having subscribed to the multicast of such LSPs from one, some or all of the devices which broadcast them. As described herein, IS-IS is used, but the system and method may use OSPF packets in place of, or in addition to IS-IS link state packet messages for the same purpose as IS-IS messages. Intra-AS topology information receiver 221 stores some or all of the LSP messages it receives in intra-AS topology information storage 222.

There can be several problems associated with attempting to receive LSP messages. First, when system 200 is initially connected to a network of the primary AS, it can take a complete LSP timeout period before the entire set of BGP information is received by communication interface 210. Furthermore, it is possible that the network connection is to a LAN coupled to a single router that provides IGP information. In such case, the router may never send IGP information via the LAN. To avoid these problems, upon system startup or detection of connection to a network, intra-AS topology information receiver 221 may provide an IS-IS partial sequence number packet or an OSPF link state request packet. Additionally, intra-AS topology information receiver 221 may attempt to establish a neighbor relation with the router on the LAN, which will then forward the IGP information to system 200.

In one embodiment, each link state packet message received by intra-AS topology information receiver 221 contains a unique identifier of the physical or logical device from which the packet is sent (a router is a physical device, and a logical device is a device such as an IS-IS pseudo node or an OSPF designated router), such as the MAC address of the device or another unique identifier of the device in the most significant six octets, an octet identifying the device as a logical device and an octet signifying whether additional parts are required to complete the link state packet. This eight octet identifier is referred to herein as the LSP identifier. Intra-AS topology information receiver 221 hashes the most significant seven octets in the LSP identifier to identify an offset from the start of a hash table in intra-AS topology information storage 222 corresponding to an entry in the hash table. Each entry in the hash table contains a preassigned address in intra-AS topology information storage 222 into which the link state packet may be stored as well as the LSP identifier of any link state packet stored at that address. Because two or more link state packet addresses may hash to the same result, intra-AS topology information receiver 221 checks the entry in the hash table at the offset identified from the hash result to identify if a different LSP identifier is stored at that entry in the hash table. If so, intra-AS topology information receiver 221 selects the next possible entry of the hash table and performs the attempt again, repeating this process until the LSP identifier at the selected entry of the hash table is blank or matches the LSP identifier of the packet it received. If the selected entry of the hash table is blank, intra-AS topology information receiver 221 writes the LSP identifier into the selected entry of the hash table and then writes some or all of the information from the link state packet as a set of packet information into the memory location in intra-AS topology information storage 222 specified at that entry of the hash table. If the LSP identifier of the packet received is located in the hash table, intra-AS topology information receiver 221 writes some or all of the packet information into the memory location in intra-AS topology information storage 222 specified at the entry of the hash table in which the LSP identifier was located. As a part of this process, intra-AS topology information receiver 221 may preserve the prior packet information before overwriting any previous packet information for that physical or logical device. Preserving the prior packet information can allow changes to the packet information to be identified for use as described below. Data structures other than a hash table may be used in other embodiments of the present invention.

D. Determination of Topology from Passive Packets.

Periodically, using a timer with a period that may be different from the 20 minute reporting period many IS-IS devices use or the 60 minute reporting period OSPF devices use, node identifier 223 scans intra-AS topology information storage 222 and, using the sets of packet information stored in intra-AS topology information storage 222, builds a list of nodes on the network having the topology being identified.

There are different types of nodes that node identifier 223 identifies. One type of node is a router. A router corresponds to a physical router on the network. A second type of node is a logical router, such as an IS-IS pseudo node or an OSPF designated router. A logical router is defined as a logically separate node on the network, even though the logical router may physically be the same as a physical router that will also be identified as a node on the network. A third type of node is an internal network (or an external network) coupled to one or more of the physical routers. In one embodiment, some logical routers will be designated for these networks.

Node identifier 223 starts at the top of the hash table in intra-AS topology information storage 222 and locates the first entry in the hash table having an LSP identifier. Node identifier then selects from intra-AS topology information storage 222 the set of packet information at the memory location specified by the entry in the hash table and identifies the type of node to which the packet itself corresponds.

Node identifier 223 uses the LSP identifier in the entry in the hash table to determine whether a packet corresponds to a router or a logical router. If the LSP identifier has a next-to-the-least significant octet (e.g. octet 1) that is all zeros, the packet corresponds to a router and otherwise, the packet corresponds to a logical router (The techniques described herein relate to IS-IS messages, however, the present invention applies to any IGP message, such as OSPF. To identify a logical router from an OSPF message, node Identifier 223 investigates the SP type. If it is "Network-LSA", the LSP identifier is a logical router.)

For each new node it identifies, node identifier 223 builds a record for the node. Node identifier 223 selects a unique node designator and adds the identifier to the record. In one embodiment, the designator is selected as a sequential number one higher than the last node identified using a designator counter in node identifier 223, which node identifier 223 initializes to zero each time it begins its periodic operation.

If the node is a router node, which node identifier 223 detects because the next-to-the-least significant octet in the LSP identifier is zero (or has an SP type of Router-LSA for OSPF messages), node identifier 223 reads the IP address and LSP identifier from the packet information stored in intra-AS topology information storage 222 and adds it into the node record. Node identifier 223 stores the node record in intra-AS topology storage 222.

In one embodiment, a link state packet will arrive as separate parts, and the present invention accommodates multi-part link state packets, for example by making accommodations for storage of the additional parts in some or all of the data structures described above.

Some or all of the link state packets will identify IP addresses of internal networks to which they are coupled within the AS network, as well as a metric that may be used to identify a cost to reach the internal network from that router, such cost being defined by the operator of the autonomous system or assigned automatically by the router. Such network information is stored in intra-AS topology information storage 222 by intra-AS topology receiver 221 with the set of packet information for the router. After node identifier 223 builds and stores the record for the router node, using the packet information from the router that it has just used to build the record for the router node, node identifier 223 then attempts to identify as new nodes any networks that it has not already identified as a node.

To identify a network as a node, node identifier 223 reads the internal reachable networks, the mask, and the metric from the set of packet information of the router it just identified. For each network listed as an internal reachable network, node identifier 223 scans the node records already stored in intra-AS topology storage and attempts to match the IP address of the network to IP addresses of nodes having a type corresponding to a network. If the network is already identified as a network type node in intra-AS topology storage, node identifier 223 either does nothing, or it substitutes a new network node record containing the network address and network mask for the existing node record for that network. The network node record substituted uses the same node designator as the old record for the network. Otherwise, node identifier 223 builds a new record for the network with a type corresponding to a network, and includes the network address, network mask and metric it retrieved from intra-AS topology information storage 222 and assigns a new designator to the record by storing the value of the designator counter in the record and incrementing the counter. Node identifier 223 then stores the record in intra-AS topology storage 225. Node identifier 223 repeats these steps for each internally reachable network listed in the set of packet information for the router.

If the node is a logical router node, which node identifier 223 identifies because the next-to-the-least-significant octet in the LSP identifier will not be zero (or the SP Type will be Router-LSA for OSPF messages), node identifier 223 stores in the record a type indicating a logical router, the LSP identifier and the node designator it sequentially generates using the designator counter. Node identifier 223 then increments the counter. Node identifier 223 then attempts to identify the network address of the network for which the logical router is designated.

To identify the network address, node identifier 223 reads the LSP identifiers of the neighbor routers from the set of packet information in intra-AS topology information storage 222. Node identifier 223 then uses the hash table to locate the sets of packet information received from those neighbor routers and stored in intra-AS topology information storage 222, and reads from the sets of packet information the networks identified as internal reachable networks for those routers and the network mask for those routers. If all of those routers share a common internally reachable network prefix, node identifier 223 places the network address of that network and the network mask into the record for the logical router. If not, node identifier 223 does not place a network address of that network and network mask into the record. In both cases (a network address in the record or no network address in the record), the record for the logical router is stored in intra-AS topology storage 225 as a node.

In one embodiment, as described above node identifier 223 adds a type of the node to the records it builds, with routers and logical routers having one type and networks having another type. This information is stored with the record in intra-AS topology storage 225.

After node identifier 223 identifies each node, node identifier 223 uses the entries in the hash table to select another set of packet information from intra-AS topology information storage 222 and repeats the node identification process for that set of packet information until all sets of packet information have been used to identify nodes as described herein.

Either when all the nodes have been added or during the addition of each node, or during the addition where possible and otherwise, after all nodes have been added, node identifier 223 uses the information in intra-AS topology information storage 222 to link the nodes to build a graph in intra-AS topology storage 222. Routers are linked to networks described as connected to that router in the LSP for the router. In addition, the LSP information received for each router or logical router contains adjacency information that describes the one or more routers or logical routers to which the router or logical router is connected. For each such connected router or logical router, node identifier 223 checks to ensure that the adjacency information is listed in both directions. For example, if the LSP information for router 1 lists a connection to router 17, node identifier 223 checks the LSP information for router 17 to ensure that its adjacency information lists router 1. If the adjacency information for both are consistent, node identifier 223 builds the indicated link in intra-AS topology storage between the two nodes.

In one embodiment, node identifier 223 need not rebuild the information as described above each time. Instead, the changes identified by intra-AS topology information receiver 221 stored in intra-AS topology information storage 222 are used by node identifier 223 to identify the changes. Node identifier 223 applies the changes to the last set of information it built as described above to create a new set of information. After node identifier has applied several rounds of changes in this manner (e.g. every tenth time), node identifier 223 may rebuild the information as described above.

E. Identifying the Least Cost Paths.

Least cost path identifier 226 identifies the least cost path for some or all paths in the topology stored in intra-AS topology information storage 222. In one embodiment, least cost path identifier 226 applies the conventional Shortest Path First (SPF) algorithm to the graph of the topology information stored in intra-AS topology information storage 222 to identify the least cost path between each of the paths between any two points defined by the records in intra-AS topology information storage 222. For each path, least cost path identifier 226 builds a record and stores it into intra-AS topology storage 225. The record contains the source and destination identifiers (e.g. MAC addresses or another identifier) of the two points, identifiers of all intermediate devices, and the cost.

In one embodiment, LSP information contains a type of the cost, and this information may be stored with the LSP information. Least cost path identifier 226 uses the following preference order when identifying a least cost path:

1. Internal metrics of OSPF level 1 (OSPF area nonzero).
2. Internal metrics of OSPF level 2 (OSPF area zero).
3. Internal metrics of IS-IS level 1 internal routes.
4. Internal metrics of IS-IS level 2 internal routes.
5. External metrics of OSPF AS external routes.
6. External metrics of IS-IS Level 1 external routes.
7. External metrics of IS-IS level 2 external routes.

Any metric having a higher preference order will always be preferred over one having a lower preference order by least cost path identifier 226.

In one embodiment, intra-AS topology information receiver 221 may request and/or receive (e.g. via SNMP or telnet) statically programmed metrics and routes as well as metrics and routes manually entered to a router during configuration of the router or during an automatic configuration of the router. In such embodiment, these metrics have the highest preferences, with the statically programmed metrics having the highest preference between the two. In one embodiment, intra-AS topology information receiver 221 may add to the intra-AS topology storage nodes to accommodate ISIS or OSPF external network reachability information also contained in the LSPs describing physical routers and mark such metrics as external.

In one embodiment, least cost path identifier 226 maintains two sets of information in intra-AS topology storage 225. One set is designated as a working area and the other is designated as a current area. Least cost path identifier 225 performs the identification of the least cost paths in the working area, and then swaps the designations of the working area and the current area. Subsequent retrievals described below are made from the current area to prevent retrievals of partially updated information.

F. Inter-Area Topology Information.

Figure 2B:
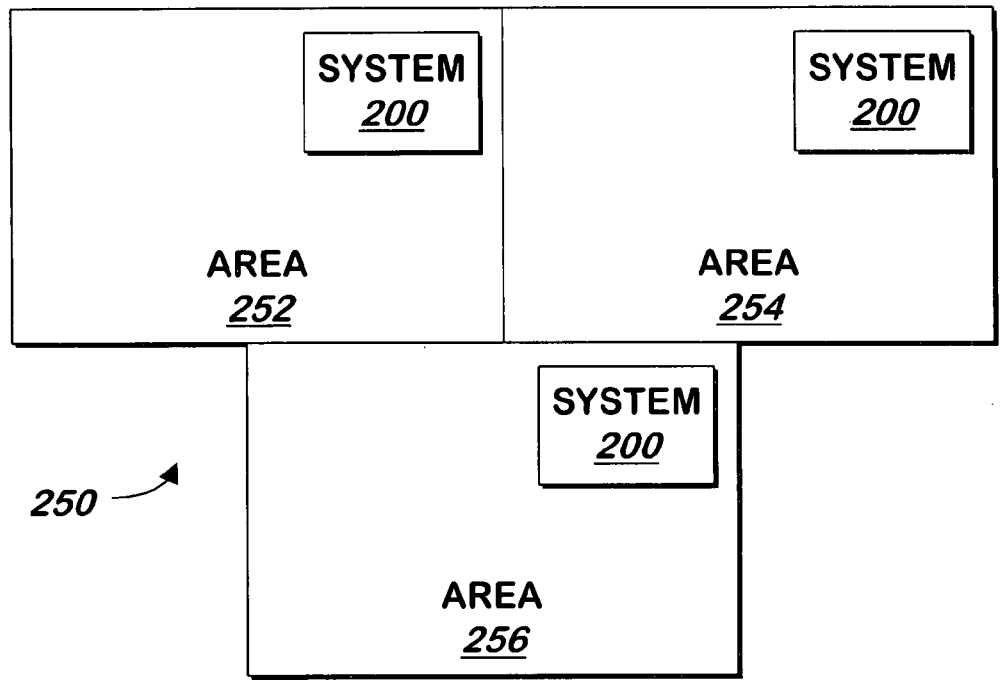
FIG. 2B is a block schematic diagram illustrating the placement of the systems of FIG. 2A in multiple areas of an autonomous system according to one embodiment of the present invention.
Figure 2C:
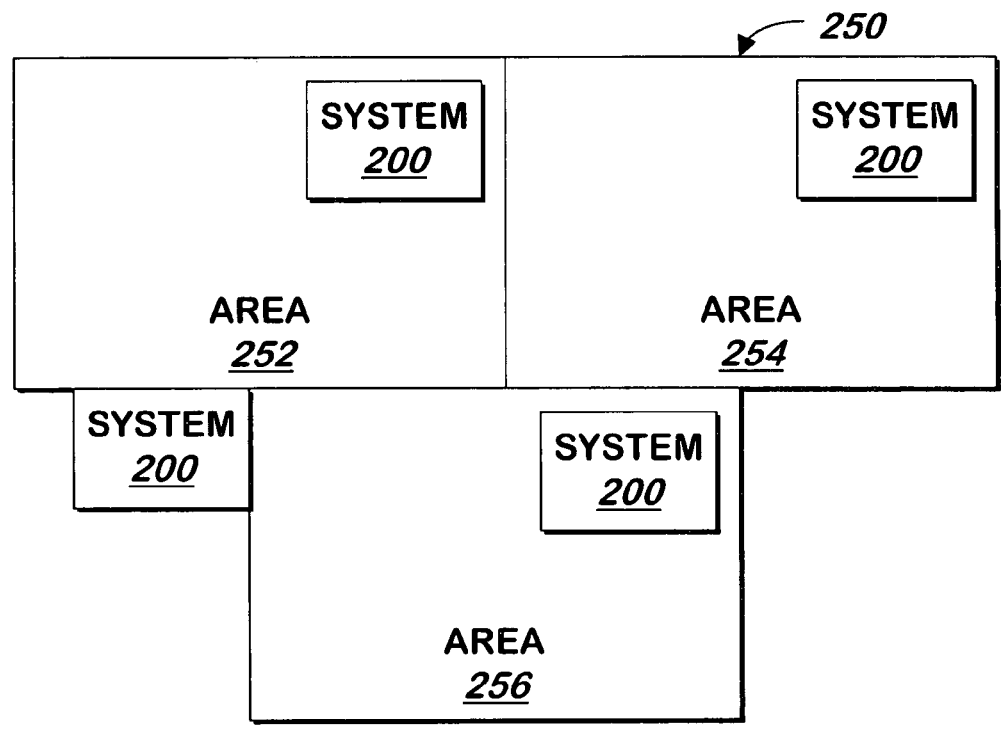
FIG. 2C is a block schematic diagram illustrating the placement of the systems of FIG. 2A in multiple areas of an autonomous system according to another embodiment of the present invention.

Referring momentarily to FIGS. 2A, 2B and 2C, in one embodiment, an autonomous system 250 may be divided into two or more areas 252, 254, 256 each with one or more systems 200 discovering the network topology for the area as described above. Each area 252, 254, 256 may contain a different subset of the routers, logical routers and networks of the autonomous system. Although three areas 252, 254, 256 are illustrated in the figure, any number of areas may be used.

If the autonomous system is divided into multiple areas, some LSPs may not cross area boundaries. In such case, different systems 200 may be used to monitor each different area of the autonomous system, with the topology information from each intra-AS topology information storage 225 consolidated into one or more of the systems, or a different system 200 not used to monitor LSPs for any area.

To consolidate such information, in one embodiment before least cost topology identifier 226 changes the designation of the areas of intra-AS topology storage 225 between working area and current area, least cost topology identifier 226 signals inter-area requester/retriever 224. Inter-area requester/retriever 224 requests from other systems 200 serving other areas of the same autonomous system all of the records in their current portion of their intra-AS topology storage.

For any system 200 receiving such a request, the communication interface 210 for such system will forward the request from input/output 210 to inter-area requester/receiver 224, which will respond by retrieving the records from the current area of intra-AS topology storage 225 and providing the records to the requesting inter-area requester/receiver 224 via communication interface 210. The requesting inter-area requester/receiver 224 will store the records in the working area of its own inter-area topology storage 225 before swapping the area designations as described above.

It is not necessary for every system 200 to collect all of the topology information from every other system. In one embodiment, only one such system 200 collects and the others provide the information. In another embodiment, represented by FIG. 2C, a system 200 not monitoring LSPs from any area makes all of the requests and the systems 200 monitoring the LSPs do not make requests, but merely provide the information to that requesting system 200. In such embodiment, the system 200 collecting the information may exist as described in FIG. 2A, optionally without elements 221, 222, 223 and 226, with the other systems each optionally containing only an intra-AS topology identifier 220 capable of responding but not initiating such requests, and also containing communication interface 210.

G. Identification of External Network Topology.

Referring again to FIG. 2A, while intra-AS topology identifier 220 identifies topology information for routers and networks under control of the autonomous system whose topology is being identified, active topology identifier 230 identifies topology information for border routers of the primary AS as well as other autonomous systems and internal networks of other autonomous systems. Such autonomous system is referred to herein as the primary autonomous system and other autonomous systems are referred to as external autonomous systems. Routers of the primary system coupled to external autonomous systems are referred to herein as "border routers" because, although they are part of the primary autonomous system, they are coupled to routers of external autonomous systems at the border of the primary autonomous system.

BGP subscriber/receiver 231 subscribes to (I)BGP information on each border router or one or more route reflectors or other devices that may store (I)BGP information or other similar information by establishing a connection with such devices. The IP addresses of each of the border routers may be supplied to BGP subscriber/receiver either manually (such as by a system administrator logging into BGP subscriber/receiver via communication interface 210 and a conventional personal computer with a web browser (not shown) coupled to communication interface input 208 via the Internet a LAN or another manner of communications) or by retrieving them from a list from another device and BGP subscriber/receiver 231 uses these IP addresses to establish the connection to receive the (I)BGP information provided by each of the border routers. When the (I)BGP information is received, BGP subscriber/receiver 231 stores the (I)BGP information into entries in inter-AS storage 232, border router storage 236 or both as described in more detail below.

In one embodiment, border router storage 236 contains entries containing a network prefix and the IP address of the border router that can send communications to devices having a network address contained within the prefix. BGP subscriber/receiver 231 builds and stores into border router storage 236 these entries as it receives the (I)BGP information. Border router storage 236 may be used as described below to locate border routers that can send communications to a particular network address or address and mask combination using the entries it contains.

In one embodiment, before it stores the entries into border router storage 236, BGP subscriber/receiver 231 clears any existing entries for that router from border router storage 236. In another embodiment, such clearing is not performed and BGP subscriber/receiver only adds new entries that do not match any entries in border router storage 236 but leaves all of the old entries intact, preserving outdated information as a source of potentially usable paths in the direction opposite the direction to which the (I)BGP information relates, outbound from the primary AS. In one embodiment, each entry in border router storage 236 is timestamped by BGP subscriber/receiver 231 when it inserts the entry. Before BGP subscriber/receiver 231 adds entries not already in border router storage 236, it clears entries having a timestamp older than a certain time.

In one embodiment, each entry supplied by BGP subscriber/receiver 231 to information storage 232 contains an identifier of a border router (e.g. its IP address) from which (I)BGP information was received, a network prefix that identifies a set of one or more network addresses for which the router is capable of forwarding communications, and a set of one or more ordered or partially ordered autonomous system identifiers that identify the order of each autonomous system through which communications to that set of addresses will be forwarded to allow the border router to communicate with that address or those addresses. (Partially ordered information may contain some ordered AS identifiers and some AS identifiers having an unknown order, and may be assumed to have all possible orders of the non-ordered information) All of this information is received from the router as part of the (I)BGP information. In one embodiment, BGP subscriber/receiver 231 may store entries (e.g. clearing out or preserving old entries or preserving them for a limited period of time) in inter-AS storage 232 in a manner similar to that described for preservation of entries in border router storage 236 as described above.

H. Identification of Additional Paths.

The information above described the identification of paths from the primary AS to external autonomous systems. In one embodiment, it is assumed that such paths are potentially symmetrical: that the same paths may be used from an external AS to the primary AS. Thus, the paths identified above may be both inbound and outbound to and from the primary AS. It has been found that this is not always the case, but that if sufficient numbers of outdated paths are retained in addition to the paths identified from current (I)BGP information, that at least one of all of these paths is used inbound to the primary AS in a large percentage of the time.

However, it has also been found that the identification of other potential inbound paths can improve the percentage of time the inbound path will be a path identified. This identification may be performed by constructing a graph of all of the external autonomous systems using the (I)BGP information received, and then locating the shortest path or paths between the primary AS and each external AS. The addition of such paths can improve the probability that inbound traffic from an external AS will arrive at a border router identified either using the shortest path, or those current and outdated paths identified as described above under the assumption of a symmetrical set of inbound and outbound paths.

In one embodiment, active topology identifier 230 periodically identifies border routers as potentially capable of receiving traffic from the set of one or more IP addresses in addition to those already stored in border router storage 236. To make this identification, graph builder 233 periodically scans inter-AS storage 232 and builds a graph in a separate area of inter-AS storage 232 of all of the autonomous systems identified as paths through which communications for a set of one or more IP addresses are forwarded. For example, if one device forwards communications through autonomous systems 1, 2, 3, 4 and 5, and the same or different device forwards through autonomous systems 1, 2, 3, 4 and 6, the graph will contain autonomous systems 1, 2, 3, and 4, and a fork to either autonomous system 5 or autonomous system 6. If another router identifies a different path for a different set of IP addresses as via autonomous systems 2, 7 and 6, this information will be added to the graph as a fork from autonomous system 2 through autonomous system 7 and meeting up at autonomous system 6. In one embodiment, as it builds the graph, graph builder 233 marks each link in the graph with a unique identifier of all entries from inter-AS information storage 232 that contain that link. Because a link in the graph may be listed in several entries, each link may be marked with more than one such identifier.

After graph builder 233 builds this graph, it signals SPF route locator 234. SPF route locator 234 uses the graph to identify other border routers that, although they do not supply (I)BGP information indicating that they have a path to an autonomous system to which one of the network addresses or network address and masks stored in border router storage 236, nevertheless may have a path from that autonomous system. SPF route locator 234 uses the conventional Shortest Path First algorithm (with the metric between two adjacent autonomous systems equal to 1) to identify the shortest path between the primary autonomous system and each external autonomous system. In one embodiment, the shortest path is defined as the path that has the fewest links in the path, although other ways of identifying the shortest path may also be used. If more than one path is tied for the shortest, all shortest paths may be identified by SPF route locator 234. In other embodiments, other paths such as a certain number of the next to the shortest paths may also be identified by SPF route locator 234.

In one embodiment, SPF route locator 234 or graph builder 233 eliminates from consideration as a shortest path any path that contains links for which the smallest number of identifiers of the entries assigned to the links by graph builder 233 as described above is greater than two. Thus, a three link path where the identifiers assigned to the links are Link 1: X, Y and Z, Link 2: L, M and N, and Link 3: A, B and C would not be valid, because the smallest number of identifiers assigned to all links are 3, while the same path with link 3 instead containing X, A, B and C would be valid, because the smallest number of identifiers of every link is 2: X and any of L, M or N. This serves to eliminate paths from consideration that have more than one peer to peer relationship between the autonomous systems carrying the traffic, although other manners of such elimination may be used.

In one embodiment, SPF route locator 234 then selects the border router or border routers that communicate with the autonomous system nearest the primary AS in the identified shortest path or paths, and for each address or address and mask in inter-AS storage listed as having that same last autonomous system in its path, builds and stores into border router storage 236 one or more entries that lists the address or address and mask and each selected border router, unless such border router is already listed as one of the border routers communicating with that IP address or address and mask. In one embodiment, these additional entries are marked by SPF route locator 234 so that they may be omitted in the event that a request for topology information arrives with the destination as an internal network on the primary AS, and the source as a reachable internal network of an external AS.

I. Identification of Topology Information.

A device or administrator may request topology identifier 240 to identify topology information such as a path or paths between two addresses or to identify one or more border routers that have been identified as likely to be a border router to handle communications between two addresses by providing the source and destination network address or prefix and a code for the type of the information desired to topology administration 241. The information provided by topology administration 241 in response may be used to identify border routers on which to install filters, as input to a program to graph network flows or for any other reason. Topology administration 241 provides the network addresses or prefixes and type code for the information desired to topology locator 242, which retrieves the desired information from any of the storage areas 222, 225, 232, 236 described above in response to the type and addresses and provides the retrieved information to topology administration 241, which forwards it to the requestor. The information may include border routers that were identified as described above as likely to be used to communicate between one or more sources and one or more destinations (and/or one or more routers in the primary AS between each such border router and a device in the primary AS), or a complete path of devices within the AS and any autonomous systems (if a source or destination is coupled to an external AS). Details of how topology locator 242 retrieves representative types of this information are described with reference to FIG. 5 below.

J. Method.

Referring now to FIG. 3A, a method of collecting intra-AS topology information is shown according to one embodiment of the present invention. Packets containing topology information, such as IS-IS packets or OSPF packets are detected and received 310 as described above. The portion described above of the LSP identifier in the packet received in step 310 is hashed and some or all of the contents of the packet are stored 312 as a set of packet information using the hash as an index to a hash table as described above. The method repeats at step 310 in a continuously running process in one embodiment of the present invention.

Figure 3C:
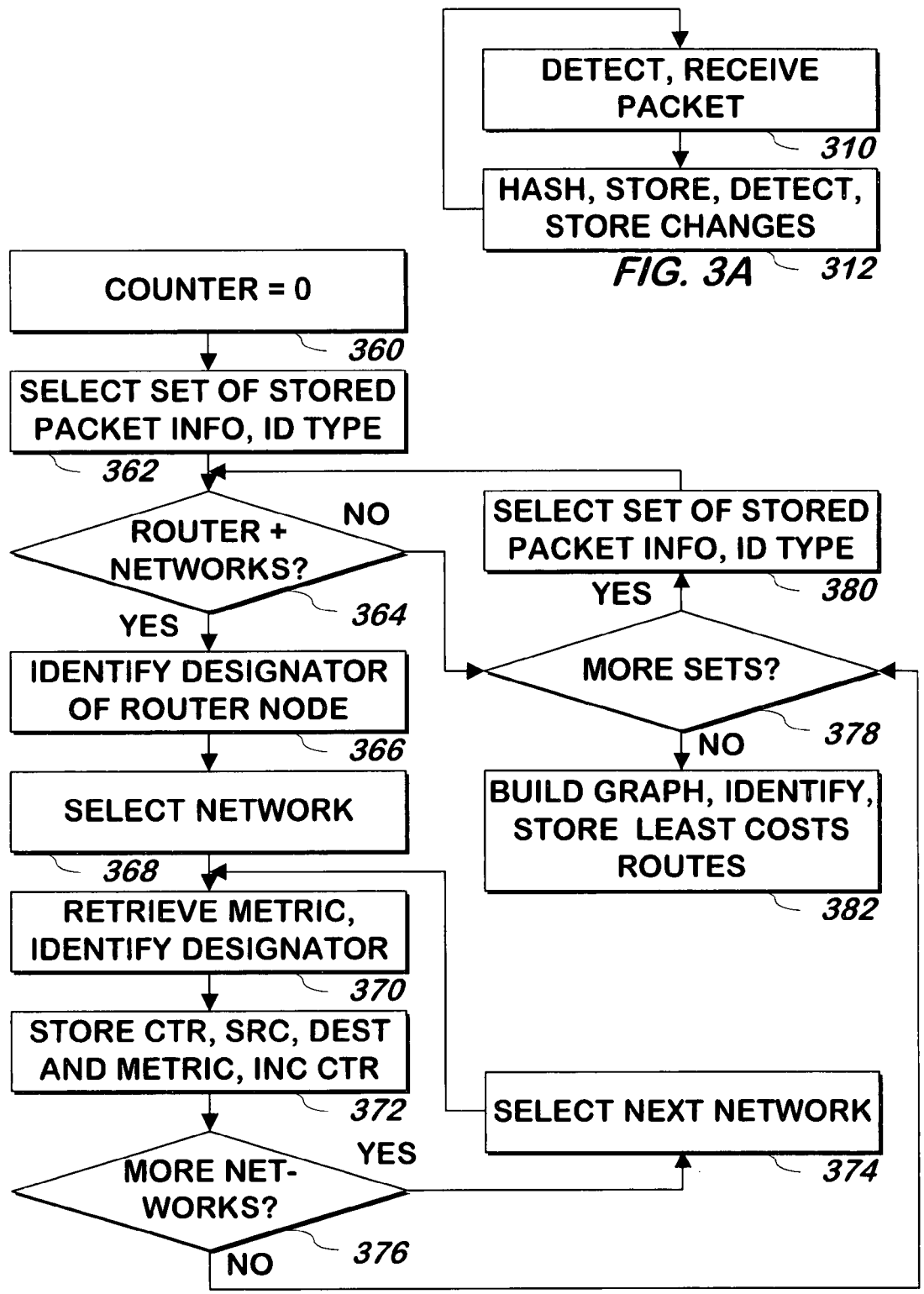
FIG. 3C is a flowchart illustrating a method of building a table of metrics between routers and internal networks according to one embodiment of the present invention.
Figure 3B:
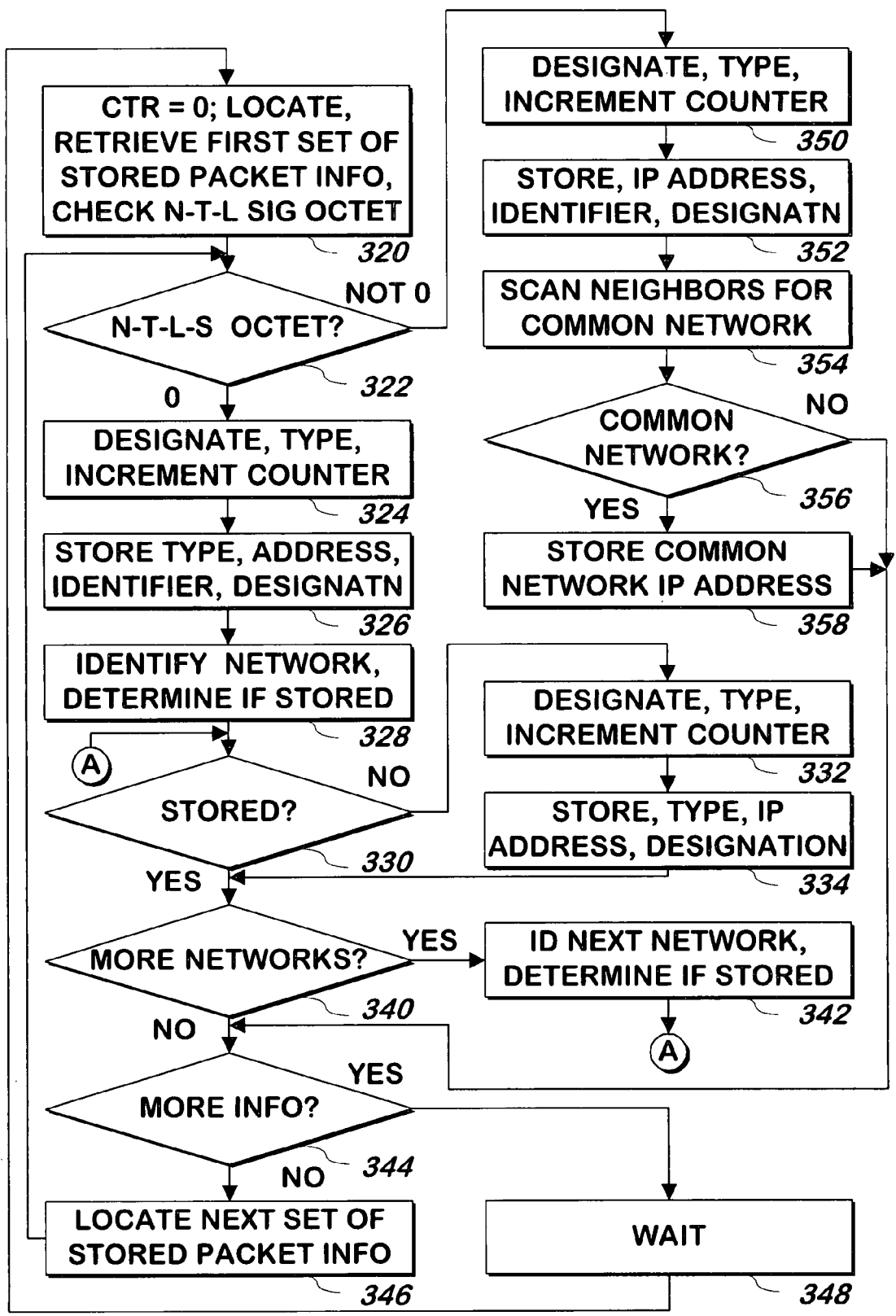
FIG. 3B is a flowchart illustrating a method of organizing topology information collected according to the method of FIG. 3A according to one embodiment of the present invention.

Referring now to FIG. 3B, a method of organizing topology information collected according to the method of FIG. 3A is shown according to one embodiment of the present invention. A counter is set to zero and a first set of packet information stored as described in FIG. 3A is located and retrieved, and the next-to-the-least significant octet of the LSP identifier (or the SP Type for an OSPF message) is checked 320. If the next-to-the-least significant octet is not zero (or SP Type is Router-LSA, the method continues at step 350, and otherwise, the method continues at step 324.

At step 324, the value of the counter is assigned as a designator to the node corresponding to the located packet and the node is also designated with a type corresponding to a router and the counter is incremented 324. The type, IP address, LSP identifier and designator from the set of stored packet information located are stored 326 as a node record for the router. An internal reachable network is identified from the stored packet information located, and records corresponding to network nodes built as described herein are scanned and the IP address of the network identified is compared with the IP address of the network nodes 328. If a node corresponding to the network identified in step 328 is already stored 330, the method continues at step 340, otherwise, the method continues at step 332.

At step 332, a node corresponding to the network identified in step 328 is assigned a designator using the counter and the counter is incremented. A type indicator corresponding to a network, the IP address of the node and designator produced in step 332 are stored 334 as a node record for the network identified in step 328, and the method continues at step 340.

At step 340, the packet information located is checked to identify whether there are more internally reachable networks, and if so 340, the next such network is identified and a determination is made 342 whether the network is already stored as a node as in step 328, and the method continues at step 330. If there are no further internally reachable networks 340, if there is another set of stored packet information 344, the next set of packet information stored is located and retrieved as described above 346, and the method continues at step 322 using that set of stored packet information. If there are no more sets of stored packet information 344, the method waits 348 and then continues at step 320. In one embodiment, step 348 is performed by terminating a process that operates the method of FIG. 3B and setting a timer. When the timer elapses, the process restarts at step 320.

At step 350, a designator equal to the value of the counter is assigned to the set of stored packet information and the counter is incremented. The identifier of the packet information located and the designator as well as a type indicator identifying the node as a router node is stored as a node record 352. The identifiers of neighbor routers are located from the located set of stored packet information and the sets of stored packet information corresponding to those neighbors are located using the hash table as described above, and if such sets of information are all in the hash table, they are scanned to identify, for the neighbors located, whether they may internally reach a common network 354 as described above. If a common network is internally reachable for all the neighbors located for the located set of packet information 356, the network address of the common network is stored 358 associated with the node record stored in step 354 for the logical router and the method continues at step 344. Otherwise 356, the method continues at step 344.

In one embodiment, multiple routers may be coupled to multiple networks via multiple logical routers. To identify which router is coupled to which network via which pseudo node, the IGP information may be monitored for when a connection between a router and a network is interrupted. When this occurs, the IGP information for the router will no longer contain (e.g. drop) the network identifier and the logical router identifier, and when the connection is restored, it may be determined that the router is connected to the network dropped via the logical router dropped.

Referring now to FIG. 3C, a method of building a table of metrics between routers and internal networks is shown according to one embodiment of the present invention. A counter is initialized to zero 360. A set of stored packet information, such as one of the sets of packet information stored in step 312 of FIG. 3A, is selected 362 as described above. If the set of stored packet information corresponds to a router (e.g. the next-to-least significant octet of the LSP identifier is zero) that has internally reachable networks 364, the designator of the router node is identified 366 by matching the most significant six or seven octets of the LSP identifier from the set of stored packet information with the LSP identifier in the node records produced as described in FIG. 3B and one of the internally reachable networks in the stored set of information selected in step 362 is selected 368.

The metric for the selected network is retrieved from the set of stored packet information for the router and the address of the network from the set of stored packet information is matched to the address in record for the node corresponding to the network produced as described in FIG. 3B and the designator for the network is retrieved from that node 370. The counter, designator for the router identified in step 366 and the designator for the network identified in step 370 are stored as a row in a table of metrics and the counter is incremented 372. In step 372, the designator for the router is stored in a source column and the designator for the network is stored in a destination column of the table of metrics. If the router corresponding to the stored packet information has additional internally reachable networks 376, the next internally reachable network for the router is selected 374 from the stored packet information and the method continues at step 370 using that network and the same router, and otherwise, the method continues at step 378.

At step 378, if there are additional sets of stored packet information 378, another set of stored packet information is selected 380 and the method continues at step 364 using that set of stored packet information. Otherwise 378, a graph is built as described above the conventional SPF algorithm and the information received and computed as described above is used to identify the lowest cost between any two nodes and build a table containing the source, destination, cost and identifiers of nodes through which the lowest cost route runs 382.

Figure 3D:
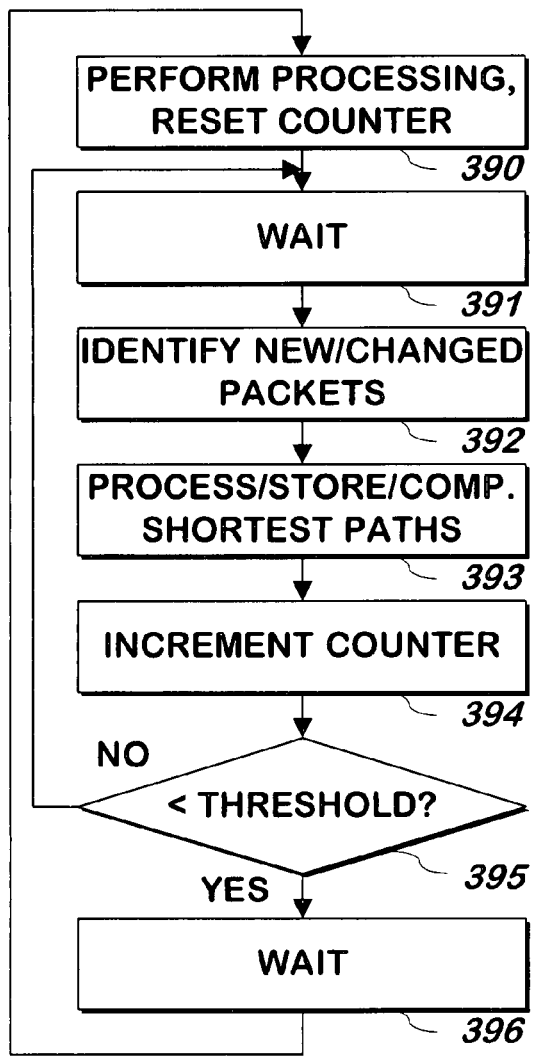
FIG. 3D is a flowchart illustrating a method of processing LSP packets according to one embodiment of the present invention.

Referring now to FIGS. 3A and 3D, in one embodiment, step 312 includes detecting and storing changes as described above. FIG. 3D illustrates a method of processing LSP packets according to one embodiment of the present invention. The processing described in FIGS. 3B and 3C is performed 390 as described therein and a counter is reset. After a period of waiting 391, the information identified as changed (which includes changes to existing information as well as new information) in step 312 of FIG. 3A is located 392. The changed information is reprocessed and stored 393, with new information being stored and changed information replacing the outdated information, and the SPF information is recomputed either for the changed information or all of the information. The counter is incremented 394, and if the counter is less than or less than or equal to a threshold value 395, the method continues at step 391, otherwise 395, a period of waiting is allowed to elapse 396 and the method continues at step 390.

Figure 3E:
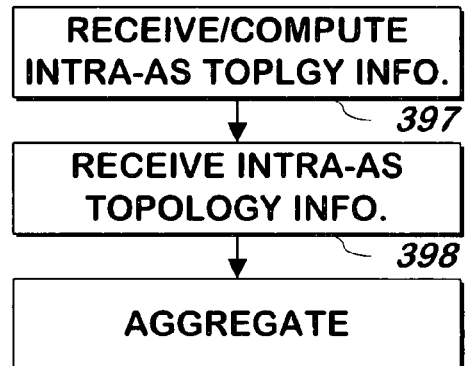
FIG. 3E is a flowchart illustrating a method of receiving inter-area intra-AS topology information according to one embodiment of the present invention.

Referring now to FIG. 3E, a method of receiving inter-area intra-AS topology information is shown according to one embodiment of the present invention. Intra-AS topology information is received or computed (as described above) from a first area 397 and intra-AS topology information is received from a second area 398. The information described in steps 397 and 398 is aggregated 399.

Referring now to FIG. 4A, a method of receiving inter-AS topology information is shown according to one embodiment of the present invention. Topology information such as (I)BGP messages may be received as described above 410.

The messages may include withdraw messages, indicating that a router is to be deleted, or update messages, indicating that a router is being added or information about the router is being updated. (In one embodiment, upon the initial establishment of communications, a complete set of (I)BGP information is received, and subsequently, only changes are received).

Changes to the configuration may be identified (using the messages as well as information stored previously) and preserved and the received information stored as described above 411. One piece of the information marked as changed is selected 412. If one or more network prefixes were deleted from the changed piece of information selected 413, that one or more prefix is marked on the graph 414 as a potential inbound path only and the method continues at step 415, otherwise, the method continues at step 415. If there are more changed pieces of information, 415, the next changed piece of information is selected 416 and the method continues at step 413, and otherwise 415, the method optionally waits 417 and then continues at step 410.

Referring now to FIG. 4B, a method of processing inter-AS topology information is shown according to one embodiment of the present invention. The method may be performed after the (I)BGP information is first requested, and subsequently, periodically. A graph is optionally built as described above 420, and one or more of the shortest paths identified 422. A shortest path is selected 424. If the selected shortest path differs from the (I)BGP information 426, it is checked for the existence of more than one peer-to-peer relationship as described above 428, and otherwise, the method continues at step 434. If the selected path has one or fewer peer-to-peer relationship 430, it is stored with the border router identifier 432 as potential path in the inbound direction from the external AS to the primary AS as described above, and otherwise, the method continues at step 434. If there are more shortest paths 434, another shortest path is selected 436 and the method continues at step 426. Otherwise 434, the method waits 438 and continues at step 420.

Figure 5:
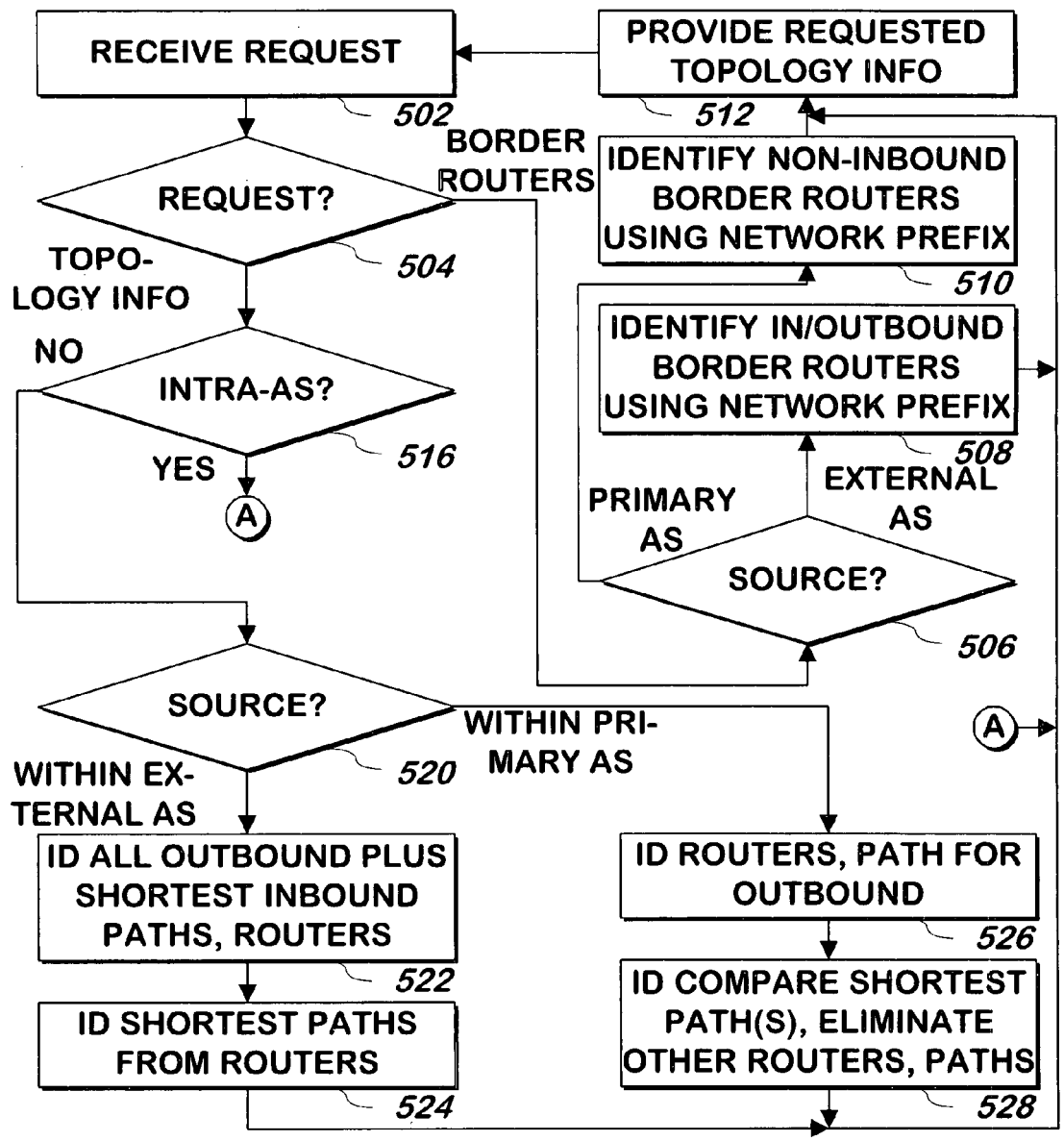
FIG. 5 is a flowchart illustrating a method of providing topology information according to one embodiment of the present invention.

Referring now to FIG. 5, a method of providing topology information is shown according to one embodiment of the present invention. Although a few types of topology information are described in the Figure, one skilled in the art will realize an almost limitless set of topology information that may be provided, using any or all of the information received as described herein, information processed as described herein, and other information. A request for topology information is received 502. If the request is a request to supply one or more identifiers of border routers 504, one or more network prefixes for the each of the source and destination may be part of the request. If the source is a network identifier of an external AS 506, the border routers corresponding to that source received as part of the (I)BGP data, as well as those border routers identified in inbound paths are identified 508, and provided 512 in response to the request and the method continues at step 502. Otherwise 506, the border routers corresponding to that source received as part of the (I)BGP data are identified 510 and provided 512 and the method continues at step 502. Because a network prefix may encompass internal networks as well as network identifiers of external autonomous systems, the network identifier may be split and steps 508 and 510 used for the appropriate portion of the request.

If the request is for topology information 504, one or more network prefixes for each of a source and destination may be received as part of the request. If the source and destination are both within the primary AS, the shortest path information calculated as described above for the intra-AS topology is provided at step 512 and the method continues at step 502. If a source or destination is outside the primary AS, if the source is within an external AS, paths corresponding to the destination that were received as part of the (I)BGP information as well as those calculated by finding the one or more shortest paths and identified as inbound as described above are identified, as well as the border routers in that path 522, and the shortest path or paths identified from processing the IGP information from each router identified in step 522 to the destination are identified 524, and the intra-AS path linked to the corresponding inter-AS path, and the entire path or paths are provided as part of step 512. Otherwise 520, the routers and paths received as part of the (I)BGP information corresponding to the destination are identified, and the shortest paths from the source to those routers are compared. The shortest of the shortest paths are identified and the remainder of the routers and paths to the destination eliminated, and the paths to the border router logically connected to the corresponding path to the destination and these paths are provided as part of step 512. Sources and destinations may be split between those inbound to the primary AS and others, and processed separately. In one embodiment, a path provided as described herein contains identifiers of devices for portions of the path within the primary AS and identifiers of autonomous systems otherwise.

What is claimed is:

1. A method of identifying at least one least cost path between at least one source and at least one destination using network topology, said method, comprising:
    identifying the network topology by:
        coupling, to each of a plurality of areas in a network, at least one first device;
        at each of said at least one first device, collecting routing information multicast from at least one router in a respective area coupled to said each of said at least one first device, at least some of the routing information collected in a first of the plurality of areas from which some of the routing information is collected not being available in a second of the plurality of areas from which some of the routing information is collected;
        at each of said at least one first device, determining from the routing information a type of a plurality of types of nodes, the type of the plurality of types of nodes selected from the group consisting of:
            a physical router,
            a logical router,
            a network coupled to a physical router, and
            combinations thereof;
        at each of said at least one first device, providing to a second device route information responsive to the routing information collected;
        at the second device, receiving the route information from each of said at least one first device;
    at the second device, responsive to the type of the plurality of types of nodes, identifying the at least one least cost path between the at least one source and the at least one destination responsive to the route information received, the at least one least cost path comprising a plurality of nodes; and
    providing unique identifiers of each of the plurality of nodes in each of the at least one least cost path identified.

2. The method of claim 1, additionally comprising receiving the at least one source and the at least one destination.

3. The method of claim 1, wherein the second device comprises at least one of the first devices.

4. The method of claim 1, wherein:
each of a plurality of portions of the routing information comprise a type of a plurality of types; and
the at least one least cost path between the at least one source and the at least one destination is identified additionally responsive to the types of at least two of the plurality of portions of the routing information.

5. The method of claim 4, wherein:
the routing information comprising a type of cost;
each of a plurality of types of cost having a preference order; and the at least one least cost path between the at least one source and the at least one destination is identified additionally responsive to the preference order of the types of cost.

6. A system for identifying and using a network topology for identifying at least one least cost path between at least one source and at least one destination, said system comprising:
a plurality of first devices, each of the plurality of first devices coupled to at least one of a plurality of areas in a network, each of the first devices in the plurality for collecting via an input/output routing information multicast from at least one router in a respective area coupled to said each of the first devices in the plurality, at least some of the routing information collected in a first of the plurality of areas from which some of the routing information is collected not being available in a second of the plurality of areas from which some of the routing information is collected, and for providing via an output coupled to a second device route information responsive to the routing information collected;
each of said plurality of first devices determining from the routing information a type of a plurality of types of nodes, the type of the plurality of types of nodes selected from the group consisting of:
a physical router,
a logical router,
a network coupled to a physical router, and
combinations thereof;
the second device, for receiving at a first input the route information from the plurality of first devices, responsive to the type of the plurality of types of nodes, for identifying the at least one least cost path between the at least one source and the at least one destination responsive to the route information received, the at least one least cost path comprising a plurality of nodes, and for providing at an output unique identifiers of each of the plurality of nodes in the at least one least cost path identified.

7. The system of claim 6, wherein the second device receives the at least one source and the at least one destination at a second input.

8. The system of claim 6, wherein the second device comprises at least one of the first devices.

9. The system of claim 6, wherein:
each of a plurality of portions of the routing information comprise a type of a plurality of types; and
the at least one least cost path between the at least one source and the at least one destination is identified by the second device additionally responsive to the types of at least two of the plurality of portions of the routing information.

10. The system of claim 9, wherein:
the routing information comprising a type of cost;
each of a plurality of types of cost having a preference order; and the at least one least cost path between the at least one source and the at least one destination is identified additionally responsive to the preference order of the types of cost.

11. A computer program product comprising a non-transitory computer readable storage medium having computer readable program code embodied therein for identifying at least one least cost path between at least one source and at least one destination, the computer program product comprising computer readable program code devices configured to cause a computer system to:
establish communications with route providing devices in each of a plurality of areas in a network, from at least one first device;
at each of said at least one first device, collect routing information multicast from at least one router in a respective area coupled to said each of said at least one first device, at least some of the routing information collected in a first of the plurality of areas from which some of the routing information is collected not being available in a second of the plurality of areas from which some of the routing information is collected;
at each of said at least one first device, determine from the routing information a type of a plurality of types of nodes, the type of the plurality of types of nodes selected from the group consisting of:
a physical router,
a logical router,
a network coupled to a physical router, and
combinations thereof;
at each of said at least one first device, provide to at least one second device route information responsive to the routing information collected;
at at least one of the at least one second device, receive the route information from each of said at least one first device;
at at least one of the at least one second device, responsive to the type of the plurality of types of nodes, identify the at least one least cost path between the at least one source and the at least one destination responsive to the route information received, the at least one least cost path comprising a plurality of nodes; and provide from at least one of the at least one second device unique identifiers of each of the plurality of nodes in each of the at least one least cost path identified.

12. The computer program product of claim 11, additionally comprising computer readable program code devices configured to cause the computer system to receive the at least one source and the at least one destination.

13. The computer program product of claim 11, wherein at least one of the at least one second devices comprises at least one of the first devices.

14. The computer program product of claim 11, wherein:
each of a plurality of portions of the routing information comprise a type of a plurality of types; and
the at least one least cost path between the at least one source and the at least one destination is identified additionally responsive to the types of at least two of the plurality of portions of the routing information.

15. The computer program product of claim 14, wherein:
the routing information comprising a type of cost;
each of a plurality of types of cost having a preference order; and the at least one least cost path between the at least one source and the at least one destination is identified additionally responsive to the preference order of the types of cost.

* * * * *